Nov. 28, 1933.    R. F. KOHR    1,937,200
BRAKE
Filed April 27, 1931

INVENTOR.
ROBERT F. KOHR
BY O. H. Fowler
ATTORNEY

Patented Nov. 28, 1933

1,937,200

UNITED STATES PATENT OFFICE 1,937,200

BRAKE

Robert F. Kohr, South Bend, Ind., assignor to Bendix Brake Company, South Bend, Ind., a corporation of Illinois Application April 27, 1931. Serial No. 533,241

3 Claims. (Cl. 188—79.5)

This invention relates to internal expanding brakes.

Broadly, the invention comprehends an internal expanding brake having an adjusting device for the friction elements arranged to increase the overall length of these elements to compensate for wear on the linings of the brake.

In the illustrated embodiment of the invention a friction element is shown including interchangeable shoes supported on steady rests and connected by an expansible member arranged between the articulated ends of the shoes and retained in position by a spring connected between the shoes.

An object of the invention is to provide an expansible device having but few parts which may be stamped from sheet steel in large quantities and produced at an exceedingly low cost.

Another object of the invention is to provide an expansible device for the friction elements of a brake which is exceedingly cheap and simple and may be easily and quickly assembled.

Yet another object of the invention is to provide an expansible device for the friction elements of a brake which may be easily and quickly applied and will effectively perform its intended function.

Other objects of the invention will appear from the following description taken in connection with the drawing, which forms a part of this specification, and in which.

Figure 1:
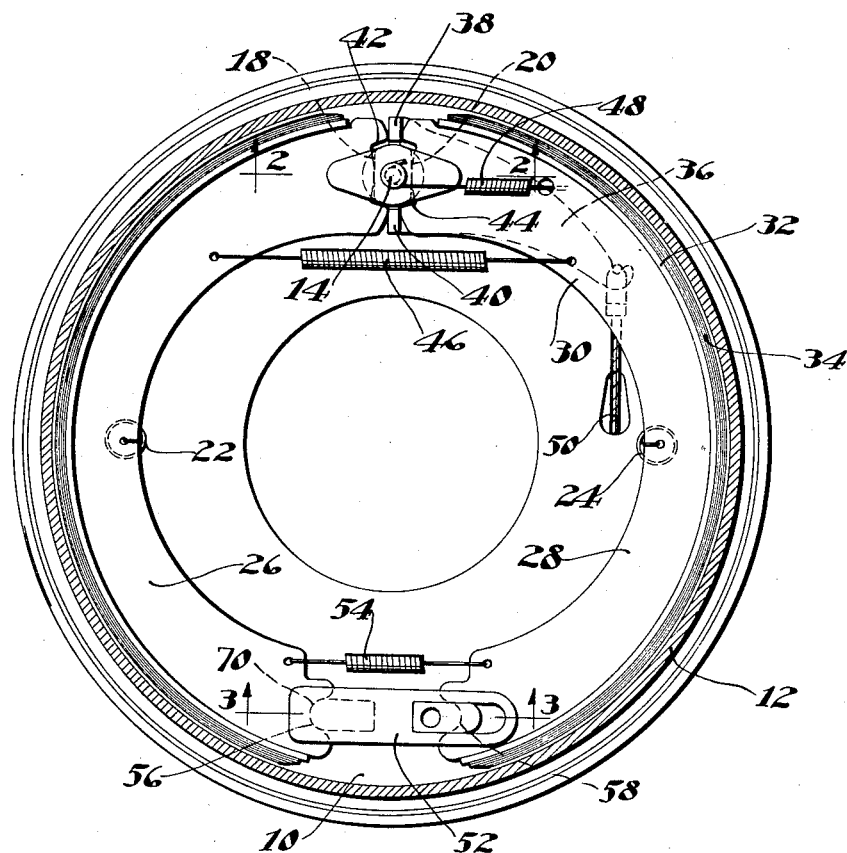
Figure 1 is a vertical section of the brake taken just back of the head of the drum illustrating the friction elements in side elevation and showing the invention as applied.
Figures 2, 3:
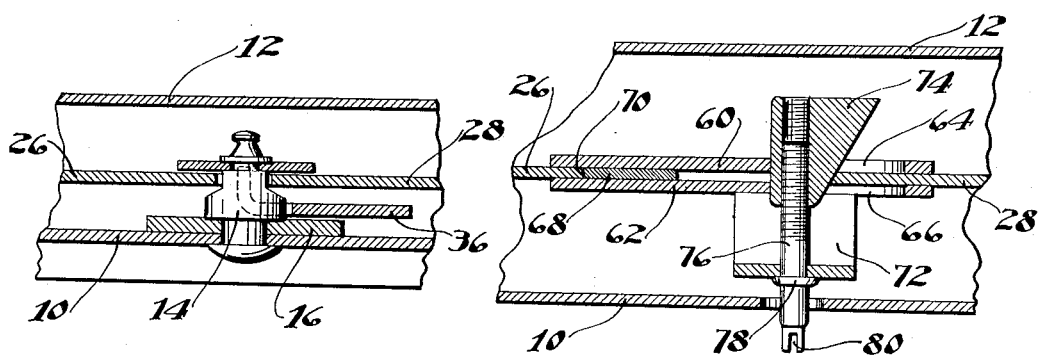
Figure 2 is a sectional view substantially on line 2—2 of Figure 1.
Figure 3 is a sectional view substantially on line 3—3 of Figure 1.

Referring to the drawing for more specific details of the invention, 10 represents a fixed support such as a backing plate. The backing plate has associated therewith a rotatable drum 12 which may be secured to a wheel, not shown.

Positioned on the backing plate is a fixed anchor 14. As shown, a reinforcing plate 16 is spot welded or otherwise secured to the backing plate and the anchor is positioned on the reinforcing plate. The anchor has a shoulder which is seated on the reinforcing plate and a portion which extends through the reinforcing plate and backing plate and riveted against the backing plate. The anchor is further provided with parallel flat anchoring surfaces 18 and 20, the object of which will hereinafter appear.

Positioned on suitable steady rests 22 and 24 are interchangeable friction elements or shoes 26 and 28. Each of these shoes includes a web 30 supporting a rim 32 to which is suitably secured a lining 34 adaptable for cooperation with the braking surface of the drum.

Positioned on the anchor 14 is a floating operating lever 36 having spaced cams 38 and 40. The friction elements 26 and 28 have their shoulders or separable ends notched as indicated at 42 and 44 for the reception of the flat surfaces 18 and 20 on the anchor.

The friction elements are held in engagement with the anchor and the floating operating cam 36 by a suitable return spring 46 connected between the separable ends of the friction element and by an auxiliary return spring 48 connected between the anchor and the friction element 28. The floating operating cam is connected to a suitable tension member 50 extending through the backing plate to a source of power, not shown.

The articulated ends of the friction element are connected by an expansible device 52 retained in position between the friction elements by a suitable spring 54 connected between the articulated ends of the friction elements. As shown, the articulated ends of the friction elements are provided with corresponding notches 56 and 58 adaptable for the reception of the expansible device.

The expansible device includes two stampings 60 and 62 provided with registering slots 64 and 66. A small plate 68 is interposed between the stampings 60 and 62 and the stampings are suitably secured to the plate. As shown, the plate has a rounded end portion 70 adapted to fit snugly in the notch 56 or 58, as the case may be. The plate 68 serves to retain the stampings in spaced relation, so that the articulated ends of the friction elements or shoes 26 and 28 may slide freely between the stampings, and the stamping 62 has a lateral portion bent to provide a bracket 72.

As shown, a wedge-shaped member 74 is positioned in the slots 64 and 66 and threaded into the wedge-shaped member is a screw 76. This screw extends through the bracket 72 and is provided with a shoulder 78 which engages the bracket. The screw is also provided with a head 80 for the reception of an adjusting wrench, and the head 80 extends through a suitable opening in the backing plate, so that the screw may be readily accessible.

In operation, the adjusting member is fitted between the friction elements or shoes 26 and 28, so that the notches 56 and 58 on the articulated ends of the shoes engage the plate 68 and the wedge-shaped member 74. In this position the articualted ends of the shoes are between the stampings 60 and 62; hence, the shoes are retained against lateral movement.

After the device has been so applied the tension spring 54 is connected between the articulated ends of the shoes, and this spring retains the shoes in engagement with the adjusting device and prevents, in cooperation with the notches on the shoes, displacement of the device. By turning the screw 76 the wedge 74 is moved transversely in the registering slots 64 and 66, and since the shoe 28 engages the wedge 74 movement of the wedge in either direction effects an adjustment of the shoe.

Although this invention has been described in connection with certain specific embodiments, the principles involved are susceptible of numerous other applications that will readily occur to persons skilled in the art. The invention is, therefore, to be limited only as indicated by the scope of the appended claims.

The above-described applying and anchoring means is claimed in my divisional application No. 693,240, filed October 12, 1933.

Having thus described the various features of the invention, what I claim as new and desire to secure by Letters Patent is:

1. A brake comprising a shoe formed with a socket in its end and having an adjusting device including corresponding stampings embracing the end of the shoe between them and having registering longitudinal slots, a spacer between the stampings having a curved end pivotally seated in said socket, a bracket formed on one of the members, a member movable transversely in the slots and a screw on the bracket threaded into the member.

2. A brake comprising friction elements having notches in their articulated ends, an adjusting device connected between the articulated ends of the friction elements including corresponding stampings having registering longitudinal slots, a spacer between the stampings having a curved end engaging the notch in one of the friction elements, a member movable transversely in the slots engaging the notch in the other friction element, a bracket on one of the stampings and a screw on the bracket threaded into the member.

3. A brake comprising a fixed support, a rotatable drum associated therewith, friction elements on the support adaptable for cooperation with the drum, operating means for the friction elements, an adjusting means for the friction elements including corresponding stampings having registering longitudinal slots, a spacer between the stampings abutting the web on one of the friction elements, a wedge-shaped member movable transversely in the slots abutting the web on the other friction element, a bracket on one of the stampings and a screw supported by the bracket and threaded into the wedge-shaped member.

ROBERT F. KOHR.